Figure 1:
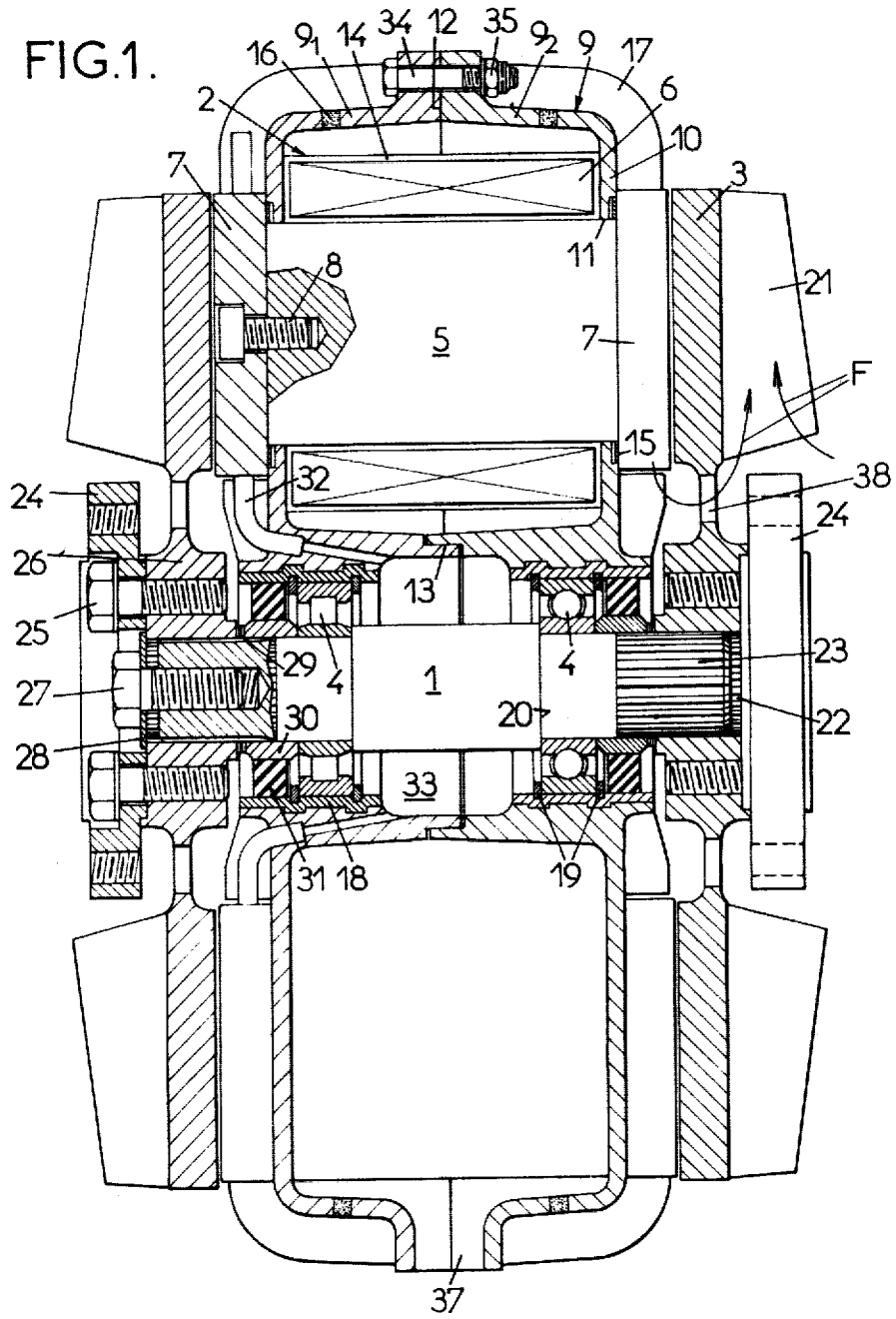

United States Patent [19]

Marandet

[11] 4,309,633

[45] Jan. 5, 1982

[54] EDDY CURRENT SPEED REDUCERS

[75] Inventor: André J. P. Marandet, Saint-Gratien, France

[73] Assignee: Labvia, S.G.E., Paris, France

[21] Appl. No.: 86,360

[22] Filed: Oct. 19, 1979

[30] Foreign Application Priority Data

Oct. 25, 1978 [FR] France .............................. 78 30354

[51] Int. Cl.³ ............................................ H02K 49/02
[52] U.S. Cl. ..................................... 310/105; 310/268
[58] Field of Search .................. 310/93, 105, 104, 268

[56] References Cited

U.S. PATENT DOCUMENTS

| | | | |
|---|---|---|---|
| 2,796,541 | 6/1957 | Bessiere | 310/93 |
| 2,833,945 | 5/1958 | Bessiere | 310/268 X |
| 2,836,742 | 5/1958 | Bessiere | 310/268 X |
| 2,842,690 | 7/1958 | Bessiere | 310/93 |
| 3,496,396 | 2/1970 | Jollois | 310/93 |
| 3,553,507 | 1/1971 | Bessiere | 310/93 |

*Primary Examiner*—Donovan F. Duggan
*Attorney, Agent, or Firm*—Stevens, Davis, Miller & Mosher

[57] ABSTRACT

It is an eddy current speed reducer whose stator comprises a ring of coils 2 having their axes parallel to the axes of the speed reducer and whose rotor comprises two discs 3 framing the stator.

The support for the coils is formed by a non-magnetic closed annular housing 9 containing the windings 6 of these coils and formed from two half-shells clamped axially one against the other by screwing flared pole pieces 7 on the cores 5 of the coils, these cores passing jointingly through openings 11 in the housing.

A preferred application is to speed reducers developing relatively low braking torques.

8 Claims, 2 Drawing Figures

EDDY CURRENT SPEED REDUCERS

The invention relates to eddy current speed reducers or retarders for slowing down a shaft, particularly a vehicle driving shaft, and comprising on the one hand an inductive stator formed by a support and a ring of coils, mounted on this support, having their axes parallel to that of the shaft to be slowed down, which shaft is mounted in two bearings carried by said support, each coil itself comprising a magnetic core surrounded by a winding of conducting wire and capped axially at its two ends by two magnetic plates forming flared polar pieces and, on the other hand, an armature rotor formed from two discs made from a magnetic material fixed in rotation on the shaft to be slowed down so as to frame axially the stator and to travel past the flared polar pieces of this latter, these discs being provided with external cooling fins.

In the known speed reducers of this type, the support for the coils is generally formed by one or more transverse plates mounted on the chassis of the vehicle.

The mounting of the coils on this support generally involves special means and/or delicate and costly operations, particularly welding.

Furthermore, the coils thus mounted are not protected from outside aggressions: they remain easily accessible to projection of mud, gravel or even washing products (jets of water) etc.

The present invention has as an aim, especially, to remedy these different disadvantages.

It is essentially characterized in that the support for the coils is formed by an annular hollow rigid closed housing made from non-magnetic metal or alloy, preferably liquid tight, the two walls, of this housing, perpendicular to the axis of the ring having therethrough respectively openings through which the ends of the cores of the coils jointingly pass so that only the flared polar pieces appear outside said housing.

In preferred embodiments, recourse is had furthermore to one and/or the other of the following arrangements:

the housing is formed from two half-shells clamped axially one against the other, in a speed reducer according to the preceding two lines, the mutual axial clamping of the two half-shells is provided, at the same time as the mounting of the coils on the housing, by screwing the flared polar pieces on the cores, the two half-shells present respectively, on the one hand, two flat annular transverse areas applied axially against one another and, on the other hand, two cylindrical annular areas fitting one into the other, in a speed reducer according to the preceding three lines, the flat areas have a larger average diameter than the cylindrical areas, vent-holes are provided in the wall of the housing, these holes being provided with a substance permeable to air but not to liquids, the housing is moulded with integral ribs adapted to facilitate cooling and to ensure the angular positioning of each flared polar piece, non circular in shape, around the axis of a single mounting screw.

The invention comprises, apart from these principal arrangements, certain other arrangements which are used preferably at the same time and which will be more explicitly discussed hereafter.

In what follows, a preferred embodiment of the invention will be described with reference to the accompanying drawings in a way which is, of course, non limiting.

Figure 2:
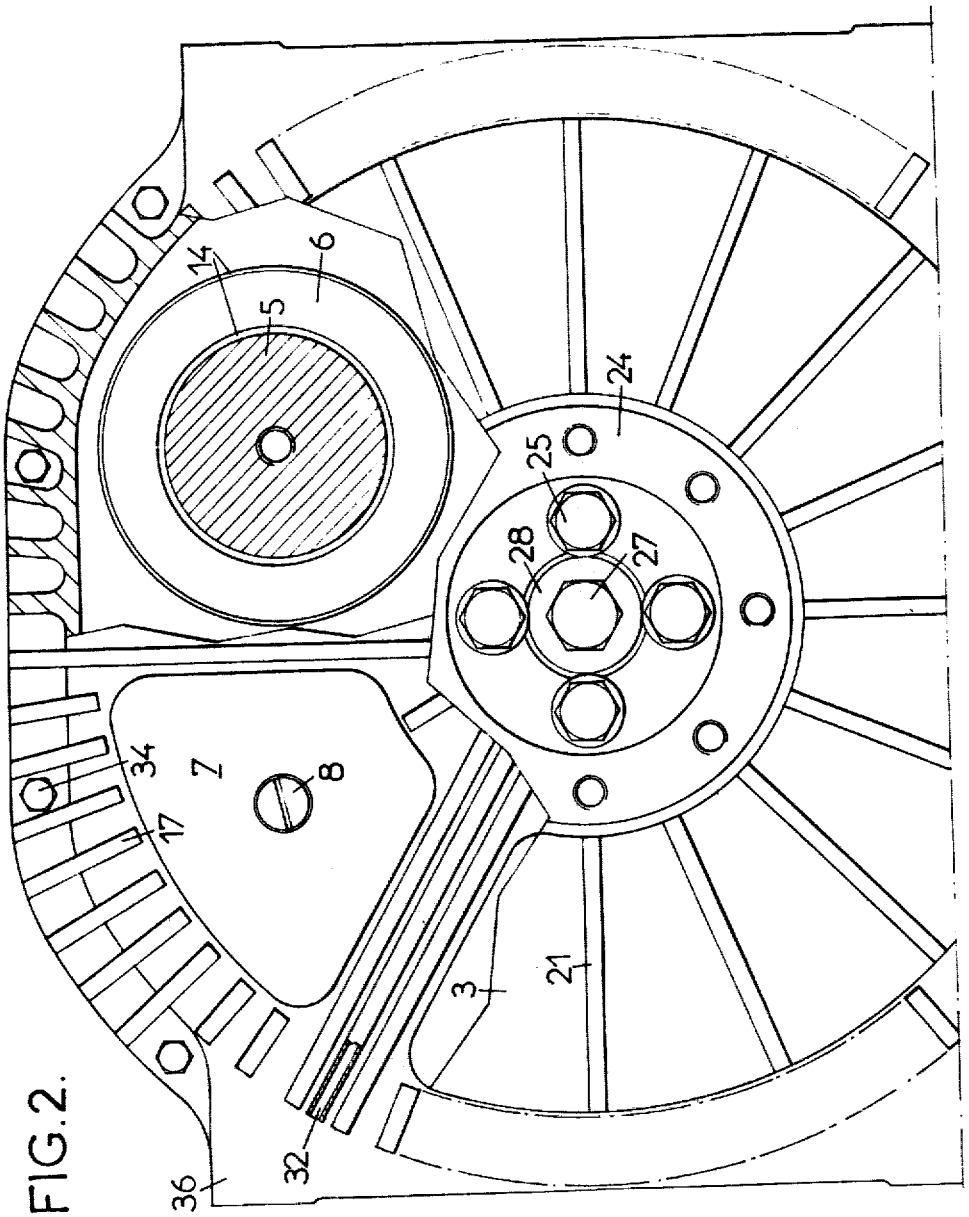

FIGS. 1 and 2 of these drawings represent an eddy current speed reducer constructed according to the invention, respectively in axial section and in an end view, with parts cut away in two different transverse planes.

The speed reducer considered here is intended to slow down a section 1 of the transmission shaft of a vehicle, this section being coupled angularly at its two ends, particularly by means of universal joints, to two other sections which connect it respectively to the gearbox and to the rear-axle of the vehicle.

In a way known per se, this speed reducer comprises:

an inductive stator formed by a support—to which we shall come back later—shaped to be mounted on the chassis of the vehicle and a ring of n coils 2 (n being an even number generally equal to 6 or 8) mounted on the support so that the axes of these coils are parallel to that of the section of shaft 1, and an armature rotor formed from two discs 3 made from a magnetic material fixed in rotation on section 1, which is mounted and centred on the above support in two bearings 4.

Each coil 2 itself comprises a core 5, generally cylindrical in revolution, surrounded by a winding 6 of conducting wire and capped at its two axial ends by plates 7 each screwed on by means of a single screw 8 and forming flared polar pieces.

These flared polar pieces 7 and discs 3 are arranged and mounted so that, during rotation of the shaft to be slowed down, these discs frame axially the stator and travel past said flared pole pieces at a short axial distance therefrom forming an air-gap.

Thus, the support for the coils and the bearings, instead of being formed as in known constructions by one or more transverse plates, is here formed by a closed annular housing 9, preferably liquid tight.

The windings 6 are entirely contained inside this housing.

The transverse walls 10 of said annular housing, i.e. extending perpendicularly to the axis of the ring, have openings 11 passing therethrough presenting a cross-section identical with that of cores 5: the axial ends of these cores pass jointingly through these openings so that only the flared pole pieces 7 project outside housing 9.

This housing, made from a non-magnetic metal or alloy, is formed from two half-shells $9_1$, $9_2$ adapted to be clamped axially one against the other.

The two half-shells present respectively:

two facing flat transverse annular areas 12, whose mutual axial application forms a stop allowing a clamping effect by axial screwing to be developed, and two complementary cylindrical annular areas 13 whose mutual jointing fitting together ensures the relative transverse centring of the two half-shells.

The dimensions of these half-shells and those of the cores are selected so that, during clamping of flared pole pieces 7 against the associated core 5 by screwing the corresponding screw 8, there can be observed successively the contact between the periphery of this flared pole piece 7 and the edge of the facing opening 11, then the mutual contact between the two transverse areas 12 of the half-shells before contact between the flared pole piece and the core.

In other words the distance, taken parallel to the axis of the speed reducer, between the outer surfaces of the two walls 10 of the two half-shells 9₁ and 9₂ simply juxtaposed axially one against the other is slightly greater than the axial length of cores 5.

Thus, we can be sure that at the end of clamping, i.e. at the end of screwing screws 8, the two half-shells 9₁ and 9₂ are firmly clamped one against the other, the housing thus formed being subjected to a prestressed effect favourable both to the mechanical strength and to the tightness of the seal thereof.

It should be noted that the screwing in question of the polar flared pieces on the cores, such screwing in known constructions only serving to fix these flared polar pieces to the cores, allows here in addition not only the formation and the closing of the support housing for coils 5–7, but also the mounting of these coils 5–7 on this housing.

It is in particular useless, to ensure such mounting of the coils on the support, to have recourse here to independent means and/or to make use of long and costly welding operations.

This is an important advantage of the invention.

It will furthermore be noted that the windings 6 of the coil are totally enclosed in housing 9; they are thus protected mechanically by this housing from all external aggressions (mud, gravel, washing water, impacts . . .).

The thickness and/or the performances—and so the price—of the protecting coating 14 usually applied to these windings may thus be reduced, such a coating being able to be completely omitted for some applications, at least when other means are provided for ensuring the angular fixing of the windings on the coils.

If necessary, resilient washers 15 may be provided between the periphery of the flared pole pieces 7 and the facing edges of openings 11 so as to facilitate the development of certain differential thermal expansions and to compensate for the possible irreversible creep of the half-shells.

To avoid the risk of creating internal overpressures due to heating up during operation of the speed reducer, vent-holes 16 may be provided in the wall of the housing arranged so as to communicate the inside of the housing with the atmosphere while forming an obstacle to the entry of washing liquids or other things inside this housing, these holes being able to be provided for this purpose with a sintered material or similar permeable selectively to air and not to liquids.

In order to exhaust the heat likely to be generated on or in housing 9 during operation of the speed reducer, there is advantageously provided on the outside of this housing cooling fins 17 moulded therewith.

Some of these fins may furthermore serve as a stop to prevent undesirable angular movements of the flared pole pieces 7 about their securing screw 8, as can be seen in the top left of FIG. 2.

To promote said heat removal, the inner volume of the housing not occupied by the coils may also be filled with an appropriate material, preferably cell-like, injected into this volume after closing of the housing: such a material may itself may replace at least partially that forming the protecting coatings 14.

In the embodiment shown in the figures, which is relative to a low or medium power speed reducer, the following may further be observed:

the two bearings 4—formed here respectively by a ball-bearing and a roller-bearing—are carried respectively by two liners 18 embedded respectively in the two half-shells 9₁ and 9₂ during moulding thereof, these bearings are positioned axially on the one hand in these liners by axial abutment against stop washers 19 of the "circlip" type housed in grooves in these liners and, on the other hand, on the section of shaft 1 by axial abutment against annular shoulders 20 of this latter, the discs 3, of the stamped type, are provided with external cooling fins 21 and are fixed angularly on the two ends of the section of shaft 1 by cooperation between longitudinal internal splines 22 provided in the central bores of these discs and complementary external splines 23 provided on said ends, perforated plates 24 allowing the shaft section 1 to be coupled to two outer universal joints are fixed by means of bolts 25 to the hubs 26 of discs 3, the whole of the rotary elements fitted on each end of the shaft section 1 are assembled by axial clamping with a screw 27 in this shaft end, said clamping resulting in the successive application against each other of the head of this screw 27, a washer 28, the hub 26 of one of the discs, one or more spacing washers 29, a ring 30 supporting a seal 31, one of the bearings 4 and one of the shoulders 20.

There can be further seen in these figures:

a greasing pipe 32 for supplying with grease chamber 33 defined inwardly by shaft section 1, outwardly by the longitudinal inner wall of housing 9 and at its two axial ends by bearings 4 and their seals 31, said pipe extending radially between two fins 17 along one of the walls 10 of the housing, bolt 34 - nut 35 systems provided possibly between transverse peripheral flanges of the two half-shells so as to positively prevent the mutual angular shifting of these latter about the axis of the speed reducer (these systems are generally useless seeing that the prestressed condition described above of housing 9 itself opposes these relative angular shifts), solid external "blocks" 36 moulded with the half-shells, defined outwardly by vertical and horizontal flat bearing surfaces and adapted to be tapped horizontally or vertically depending on the type of fixing desired for securing the stator to the chassis of the vehicle, which makes it use less to have recourse to independent securing systems, a chimney 37 communicating the inside of housing 9 with the outside and adapted to receive a plug containing the electric supply wires for windings 6, and apertures 38 provided in the annular zones of the rotor discs 3, connecting the active portion of these latter to their hubs, so as to facilitate the cooling of these discs and their fins 21 by an air flow in the direction of arrows F.

The construction of the speed reducer described above seems particularly appropriate for apparatus developing relatively average or low braking torques, i.e. between 30 and 80 m.kg, but it could also be envisaged for speed reducers developing high braking torques.

The material forming the housing may be entirely made from a non-magnetic metal or alloy both sufficiently light and sufficiently strong, e.g. a cast aluminium alloy having a mechanical tensile strength of 17 kg/mm² and a wall thickness of the order of 5 mm.

Following which and whatever the embodiment adopted, there is finally provided a speed reducer whose construction and advantages follow sufficiently from what has gone before.

As is evident, and as it follows moreover already from what has gone before, the invention is in no wise limited to those of its modes of application and embodiments which have been more specially considered: it embraces, on the contrary, all variations thereof, particularly:

those where the speed reducer considered is of a type other than the "autonomous" one described above—the word "autonomous" signifying a speed reducer mounted directly on the chassis and connected respectively to the gear-box and to the rear-axle by means of Cardan shafts—, said speed reducer being able for example to be mounted directly in cantilever fashion on a gear-box or rear-axle and the shaft section 1 being then formed directly by one end of the shaft extending from said box or axle, and those where the housing 9 containing the windings 6 of coils 2 is still "closed", certainly, but not necessarily so as to be liquid tight, the "closing" in question being still ensured by the screwing of the flared pole pieces 7 on the cores 5 and involving again an axial application one on the other of two half-shells forming said housing, but these half-shells being able to be locally perforated.

I claim:

1. An eddy current speed reducer for slowing down a shaft, particularly a vehicle driving shaft, and comprising on the one hand an inductive stator formed from a support and ring of coils mounted on this support, having axes parallel to the shaft to be slowed down, which is mounted in two bearings carried by said support, each coil itself comprising a magnetic core surrounded by a winding of conducting wire and capped axially at its two ends by two magnetic plates forming flared pole pieces, and on the other hand an armature rotor formed from two discs made from a magnetic material fixed in rotation on the shaft to be slowed down so as to frame axially the stator and to travel past the flared pole pieces of this latter, these discs being provided with external cooling fins, characterized in that the support for the coils is formed by a closed rigid hollow and annular housing made from a non-magnetic metal or alloy, preferably liquid tight, the two walls of this housing perpendicular to the axis of the ring, having respectively therethrough openings through which pass jointingly the ends of cores of coils so that only the flared pole pieces appear outside the housing, said housing being formed as two half-shells clamped axially one against the other, the mutual axial clamping of the two half-shells being ensured, at the same time as the mounting of the coils on the housing, by screwing the flared polar pieces on cores by means of screws, the screwing of the flared pole pieces on the cores involving a prestressing effect, the axial contact between the two half-shells taking place before the axial contact between the flared pole pieces and the cores.

2. A speed reducer according to claim 1, characterized in that washers are placed between the periphery of the flared pole pieces and the edge of the openings formed in the half-shells and through which the cores pass.

3. A speed reducer according to any one of claim 2, characterized in that the two half-shells present respectively, on the one hand, two transverse flat annular areas applied axially one against the other and, on the other hand, two cylindrical annular areas fitting one in the other.

4. A speed reducer according to claim 3, characterized in that the flat areas have a greater average diameter than that cylindrical areas.

5. A speed reducer according to claims 1, 2, 3 or 4, characterized in that vent-holes are provided in the wall of the housing, these holes being provided with a substance permeable to air but not to liquids.

6. A speed reducer according to claims 1, 2, 3, or 4, characterized in that the housing is moulded with integral ribs adapted to facilitate the cooling and to ensure the angular positioning of each flared pole piece, of non circular shape, about the axis of a single mounting screw.

7. A speed reducer according to claims 1, 2, 3, or 4, characterized in that liners adapted to receive the bearings (4) are embedded in the housing during moulding thereof.

8. A speed reducer according to claims 1, 2, 3, or 4, characterized in that the inner volume of the housing not filled by the coils is filled with a material, preferably cell-like, injected after closing of said housing.

* * * * *